United States Patent
Case et al.

(10) Patent No.: US 12,393,704 B2
(45) Date of Patent: Aug. 19, 2025

(54) METHODS AND SYSTEMS FOR MULTI-MODAL SECURITY ACCESS CONTROL BASED ON DETAILS OF SECURITY CIRCUMSTANCES

(71) Applicant: NXP B.V., Eindhoven (NL)

(72) Inventors: Lawrence Loren Case, Austin, TX (US); Sheilah Credo Phan, Chandler, AZ (US)

(73) Assignee: NXP B.V., Eindhoven (NL)

( * ) Notice: Subject to any disclaimer, the term of this patent is extended or adjusted under 35 U.S.C. 154(b) by 198 days.

(21) Appl. No.: 18/234,241

(22) Filed: Aug. 15, 2023

(65) Prior Publication Data

US 2025/0061239 A1 Feb. 20, 2025

(51) Int. Cl.
| | | |
|---|---|---|
| *G06F 21/60* | (2013.01) | |
| *G06F 21/53* | (2013.01) | |
| *G06F 21/57* | (2013.01) | |
| *G06F 21/74* | (2013.01) | |
| *G06F 21/85* | (2013.01) | |
| *G06F 21/77* | (2013.01) | |

(52) U.S. Cl.
CPC ............ *G06F 21/604* (2013.01); *G06F 21/53* (2013.01); *G06F 21/57* (2013.01); *G06F 21/577* (2013.01); *G06F 21/74* (2013.01); *G06F 21/85* (2013.01); *G06F 21/77* (2013.01); *G06F 2221/2113* (2013.01)

(58) Field of Classification Search
CPC ........ G06F 21/604; G06F 21/53; G06F 21/57; G06F 21/577; G06F 21/74; G06F 21/85; G06F 21/77; G06F 2221/2113
See application file for complete search history.

(56) References Cited

U.S. PATENT DOCUMENTS

| | | |
|---|---|---|
| 9,853,974 B2 | 12/2017 | Hampel et al. |
| 10,482,258 B2 | 11/2019 | Case et al. |
| 11,080,432 B2 * | 8/2021 | Mundra ............... G06F 21/85 |
| 2004/0243823 A1 | 12/2004 | Moyer et al. |
| 2016/0210260 A1 * | 7/2016 | Case ................. G06F 9/5011 |
| 2018/0075258 A1 * | 3/2018 | Circello ............... G06F 21/85 |
| 2020/0034572 A1 * | 1/2020 | Mundra ............... G06F 21/85 |
| 2021/0117579 A1 | 4/2021 | Dekens |

(Continued)

FOREIGN PATENT DOCUMENTS

| | | |
|---|---|---|
| CN | 103124975 B | 2/2016 |
| WO | 2023/287517 A1 | 1/2023 |

*Primary Examiner* — Cheng-Feng Huang (57) ABSTRACT

Methods and systems for multi-modal security access control for a System on a Chip (SoC) are disclosed herein. In an example embodiment, a method includes providing a secure enclave including a plurality of bus masters and a Sentinel Resource Domain Controller (SRDC), and receiving a request to access a control, asset, or resource. The method further includes assessing a plurality of attributes that include each of: a first attribute that is a privilege mode attribute; a second attribute that concerns an applicability or inapplicability of a Runtime Root of Trust (RRoT) mode; a third attribute relating to a bus master type; and a fourth attribute related to a security state. The method additionally includes determining, based upon the attributes, whether the request is granted or denied, and causing the control, asset, or resource to which the request is directed to be accessible or inaccessible based upon the determining.

20 Claims, 5 Drawing Sheets

(56) References Cited

U.S. PATENT DOCUMENTS

| | | |
|---|---|---|
| 2021/0232337 A1 | 7/2021 | Talvitie et al. |
| 2021/0397714 A1 | 12/2021 | Halter et al. |
| 2023/0171229 A1 | 6/2023 | Arora et al. |

* cited by examiner

METHODS AND SYSTEMS FOR MULTI-MODAL SECURITY ACCESS CONTROL BASED ON DETAILS OF SECURITY CIRCUMSTANCES

FIELD OF THE DISCLOSURE

The present disclosure relates to processing methods and systems and, more particularly, to methods and systems for providing or achieving desired or enhanced levels of security in relation to the accessing of controls, resources, or assets in regard to processing devices such as central processing units or other computer systems and devices.

BACKGROUND OF THE DISCLOSURE

Computer processing devices such as a System on a Chip (SoC) often operate in relation to, or have operating therewithin, a variety of sensitive controls or assets. Whether access is granted to such controls or assets is a significant consideration underlying whether the SoC can operate in a manner that achieves desired levels of security and/or achieve other performance objectives.

Conventional SoCs often operate to determine whether access can be granted to sensitive controls and assets by operating in a single central processing unit (CPU) security mode that distinguishes a trust level for access permissions to all types of sensitive controls or assets within the SoC. This level of trustworthiness is based solely on an execution sequence on a particular CPU. An execution monitor determines that a particular sequence is followed logically by a CPU and then establishes the access control credential of either secure, supervisor or normal. The establishment of trust in the SoC provides a single security credential with one, two or three security levels from lowest privilege to greatest privilege. This credential is then carried forward on all subsequent bus transactions so that bus access controls can allow the bus transaction initiated from the CPU to have access of resources or assets or not, depending on that CPU security mode.

For at least one or more reasons, it would be advantageous if new or improved processing methods and/or systems could be developed to address one or more concerns or provide one or more benefits.

DETAILED DESCRIPTION

Although conventional SoCs are configured to determine, and employ methods for determining, whether access to sensitive controls or assets can be granted, conventional arrangements are often disadvantageous in certain respects. In particular, such existing systems and methods are often inefficient in that access to sensitive controls or assets may only be granted under limited circumstances, or access to sensitive controls or assets may be prohibited overly frequently. For example, there exists the notion of a security violation that can arise during operation of a SoC and indicate that something is wrong. However, when the SoC access control system in a conventional SoC detects such a condition, it simply "panics" in that the system's only reaction is to halt all security functions and SoC access to protected resources and assets, and await a reset so that it can reboot in the proper sequence again and carry on again in one of its CPU security modes.

The present inventors have recognized that a significant problem associated with conventional processing methods or systems such as those implemented in or in relation to SoCs, in terms of governing access to sensitive controls or assets, is that such methods or systems are too simplistic in that such methods or systems rely upon only a single security mode when determining a level of trustworthiness or establishing a SoC access control configuration.

More particularly, the present inventors have recognized that conventional methods or systems that determine trustworthiness, access, or security by employing single mode SoC security, which can be based on the CPU execution state of a single core, are inadequate in that a SoC security violation arising in such methods or systems typically only indicates one type of security failure, even though it is typically arising from an aggregate of signals from a multitude of security incidence detection sources of varying sensing capability, scope and physical locale. Such conventional methods or systems are limited in their effectiveness in that such conventional methods or systems merely provide a SoC access control system that expresses all trustworthiness by one of its CPU execution states and reacts to all security incidents as if all security is compromised taking into account only the one security mode. In the context of a security violation indicating that something is wrong, regardless of what is determined to be wrong (e.g., which sensor detected a threat condition), there is currently no way to express this as a type of factor(s) to modify the access controls accordingly. That is, CPU execution must halt when a violation occurs, even though in fact there may be only one facet of the trustworthiness that has been compromised, which may be independent of the CPU execution state, and even though the CPU security mode could potentially continue if the security incident is contained.

The present inventors have further particularly recognized that the actual trustworthiness of a SoC involves many more factors within a SoC than just the measured result of a logical execution flow from a particular CPU. Indeed, the present inventors have recognized that there is a significant number of factors that can affect trustworthiness of (or in) a SoC, and additionally that the type of trust that is desired can vary as well, depending on a present set of SoC conditions. For example, the state of memory contents can affect trustworthiness. Additionally, other factors that can affect trustworthiness may include the physical operating environment such as the voltage stability or level, clock frequency and temperature. Further, another factor may be whether the execution sequence is started by immutable software or loadable firmware. Also for example, pin configurations and states can affect the vulnerability of the SoC (also simple, robust versus complicated, execution flows). Additionally, desired levels of security and trustworthiness can vary depending upon the type of operating environment or context. For example, some execution environments are designed and built for robust, trustworthy, predictable and limited behavior, while other execution environments with the same SoC may be rather open and highly featured and varied for high performance for a variety of interesting applications.

In view of these considerations, the present inventors have additionally recognized that there exists a need for an improved method or system for implementation in (or in relation to) processing devices such as SoCs, for assessing trustworthiness, for determining whether access should be granted to sensitive controls, resources, or assets, and for thereby providing security in a more desirable and enhanced manner by comparison with conventional methods or systems. The present inventors have further recognized that such an improved method or system for implementation in (or in relation to) processing devices such as SoCs can be realized, in at least some embodiments encompassed herein, by employing a more refined and varied set of security modes. Such an improved method or system employing a more refined and varied set of security modes can for example operate to provide access to corresponding controls, resources, or assets depending on the type of security violation or incident that may arise, or where such a security violation or incident is located (e.g., what locale is at the highest risk), and also can allow for continued use and secure operation of environments for which risk has not increased due to a detected security violation or incident. Such an improved method or system can further allow for a more capable, robust SoC overall that can handle security issues as those security issues occur and restrict access to only those controls, resources, and/or assets that are threatened.

The present inventors have further recognized that such an improved method or system for implementation in (or in relation to) processing devices such as SoCs can be realized, in at least some embodiments encompassed herein, by employing a method in which different types of security conditions are resolved into a set of bus access controls. Also, the present inventors have recognized that such an improved method or system can be achieved, in at least some embodiments encompassed herein, as a security system within an SoC that uses a variety of security incident and security state indicators to enter one of a plurality of security modes, and/or a set of access controls that combine at the point of access to permit or deny access to various resources and controls such as memory partitions, crypto, keys, security functions. Different security conditions can provide different elevated or decreased privileges.

The present inventors have additionally recognized that, in at least some embodiments encompassed herein, improved methods or systems for determining whether access should be granted to sensitive controls, resources, or assets, and for thereby providing security in a more desirable and enhanced manner, may operate by employing multi-modal security access control that takes into account various details of security circumstances. In some such embodiments, the systems may include, and the methods may include providing, a secure enclave including a plurality of bus masters and a Sentinel Resource Domain Controller (SRDC). The SRDC may include a SRDC enhanced access rights control mechanism having a SRDC trust factors attribution section and a fabric switch section, and a destination SRDC. Also, the secure enclave may have a hardware security state machine. The systems may operate to receive, and the methods may include receiving, requests to access one or more controls, assets, or resources from bus masters. Also, the systems may operate to assess, and the methods may include assessing, a plurality of attributes associated with the requests. Such attributes may take any of a variety of forms, such as privilege mode attributes, whether a Runtime Root of Trust (RRoT) mode is or is not applicable, attributes regarding bus master type, attributes regarding security state, attributes regarding domain identifiers (DIDs), or ring number attributes. Based upon any of such attributes, the requests to access the controls, assets, or resources may be granted or denied and, if granted, accessing of the control, assets, and resources may be permitted or facilitated.

Figure 1:
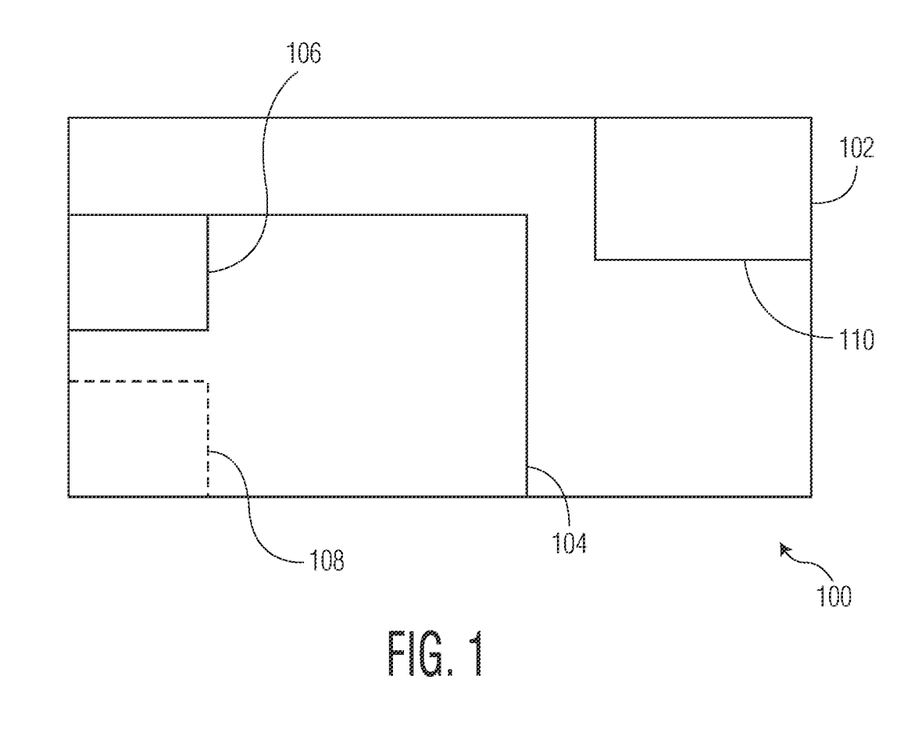
FIG. 1 is a schematic diagram illustrating a system (or secure enclave) that operates in accordance with a multi-modal access control architecture, and that particularly employs a Sentinel (Security) Resource Domain Controller (SRDC), in accordance with an example embodiment encompassed herein.

Referring to FIG. 1, a schematic diagram 100 is provided to illustrate, in a figurative manner, a system referred to as a secure enclave (or simply enclave) 102 that employs a variety of access control modes to partition its memory map and protect controls, resources, and/or assets (e.g., code, data, and controls) under different circumstance and capabilities. The enclave 102 includes a plurality of bus masters 104 including a central processing unit (CPU) 106 (other example bus masters are described further below). Depending upon the embodiment, the CPU 106 may also include, or may operate in combination with, a memory protection unit (MPU) 108 shown in dashed lines. The enclave 102 operates to grant or deny access to any of a variety of controls, assets, and/or resources including (but not limited to), for example, code, data, controls, peripherals, or memory locations (e.g., the first 4K of memory locations).

To achieve such operation, in the present embodiment, the enclave 102 includes a Sentinel Resource Domain Controller (SRDC) 110, which is an integrated, scalable architectural framework for access control, Sentinel memory protection and peripheral isolation. It provides a mapping of CPU privilege mode, SRDC state and LMDA (Life Cycle Management and Debug Authentication) State into protection modes, rings, and domains. The access control scheme defined by the SRDC 110 supports a 4-level hierarchical ring definition, in which: Ring0>Ring1>Ring2>Ring3. Further, the SRDC 110, in addition to employing the aforementioned architectural framework, also adds another layer of access controls, namely, a three-level privilege mode including a Machine Mode, a Supervisor Mode, and a User Mode, in which: Machine Mode>Supervisor Mode>User Mode. Additionally, different access control policies based on read, write, and execute (R/W/X) references are supported. Along with the privilege (PRIV) and ring (RING) attributes, a domainID (DID) is generated for every transaction and forms the hardware basis for implementation of the SRDC's access control mechanisms.

Further with respect to the present example embodiment, the SRDC 110 operates in a manner in which there is assignment of chip resources to processing "domains". In this regard, each bus master is assigned a unique domain identifier (DID) for each of four LMDA states (RROT/unknown, debug, secure, fail), where DID is an attribute associated with every system bus transaction, and which is used in conjunction with the ring number attribute generated based on SRDC software mode and LMDA state. Also, the privilege mode (e.g., of the CPU 106) is also attached to each bus transaction. For non-CPU masters, the privilege mode is inherited from the privilege of the master that programmed it, or is programmed in a SRDC DAC register. Such a manner of operation provides a three-dimensional array (PRIV, DID, Ring) of programmable access control rights, which is built upon the four-level hierarchical access control model (again, where Ring0>Ring1>Ring2>Ring3) with three privilege modes (again, where Machine Mode (MM)>Supervisor Mode (SM)>User Mode (UM)) defined by multiple sets of user-programmable R/W/X (Read, Write, execute) flags per access state.

Additionally, in the present embodiment, there may be access controls on slave address spaces using memory checkers. More particularly in this regard, there may be three types of SRDC memory checkers: (a) Memory Block Checker (MBC), with fixed sized blocks for DMEM and IMEM; (b) Memory Slot Checker (MRC), with user-defined regions for ROM, PKC DMEM, and memory spaces external to the security subsystem; and (c) Peripheral Slot Checker (PSC), with fixed sized blocks for peripherals. Additionally, in the present embodiment, the programming model and hardware implementation is distributed across multiple submodules, which supports a broad, highly-configurable architecture definition, and supports efficient mechanisms for mode and state changes. Further, in the present embodiment, the SRDC includes a programmable software mode allowing the core to control the entry and exit into operating modes. Further, in the present embodiment, there may be an option to generate an interrupt request to the Sentinel CPU in the event of an access violation.

In at least some embodiments, the SRDC implementation may be distributed across multiple submodules instantiated throughout the device or system. For example, in one example embodiment, the SRDC may each of the following SRDC submodules: (1) SRDC_MGR—The Manager (MGR) submodule coordinates all programming model reads and writes; (2) SRDC DAC—The Domain Assignment Controller (DAC) handles the generation of the domain identifiers and ring numbers per master; (3) SRDC_MRC—The Memory Region Checker (MRC) implements access controls for on-chip internal and external memories based on preprogrammed descriptor registers; (4) SRDC_MBC—The Memory Block Checker (MBC) implements access controls for on-chip internal memories based on a fixed block size format; and (5) SRDC_PSC—The Peripheral Slot Checker (PSC) implements the access controls for Sentinel peripherals based on the preprogrammed slot descriptor registers. Also, in at least some embodiments, the SRDC submodules only support the AMBA-AHB (Advanced Microcontroller Bus Architecture—High Performance Bus) bus protocol for bus accesses and IPS for programming model accesses.

It should be noted further that, in at least some embodiments, the SRDC module does not directly support any external interfaces. For example, the internal interfaces may include a standard 32-bit slave bus for all programming model accesses, connections to the address phase signals associated with AHB system buses and connections to the slave peripheral buses. Additionally, with respect to memory map/register definition, in at least some embodiments, the SRDC module may support a large number of architecturally-defined, program-visible registers distributed across several (e.g., three four-kilobyte) address slots. The actual registers present in any given device are application specific. Further, the register resources of the SRDC programming model can be accessed based on ring number. In some embodiments, the programming model registers may be accessed via 8-, 16- or 32-bit reads and 32-bit write references, with Ring0 or Ring1 and Machine Mode attributes. Attempted accesses in a different operating mode, using unsupported write data sizes, writes to read-only resources, or to reserved spaces are terminated with an error unless noted otherwise.

Also, in at least some embodiments, access to the SRDC programming model may be further restricted by programming the SRDC slots on the PSC. The SRDC slot assignment may be different for each implementation. For example, the SRDC programming model may be partitioned into four groups of registers: (a) basic hardware control and configuration; (b) domain errors: location and details; (c) domain and attribute assignments; and (d) memory region/block and peripheral checkers. It should be noted that many of the programming model registers in SRDC may be organized as 2- or 3-dimensional data structures. For the 2-dimensional structures, the generic arrays contain "m" words representing the "columns" and "n" instances of the structure representing the "rows". These may be described as structure [n][m], and may appear in the address space of the programming model memory map in the standard C language row-major layout—that is, the "m" words representing the "column" appear sequentially with the entire row replicated "n" times. The SRDC register structure may for example use the naming convention of SRD_<regname>_Wm_n, where the column number "m" appears as a numeric suffix on the W (32-bit word) identifier, and the row identifier "n" appears as the final numerical suffix. The programming model for memory region checkers and memory block checkers are identical. In this section MC, memory checker, is used to describe both types of checkers, MBC and MRC.

It should be appreciated that, although an architectural definition of a SRDC programming model is presented herein, each embodiment or implementation may be SoC-specific and highly dependent on the device requirements.

In the present embodiment, the set of modes available to various processes of the enclave 102 is dependent upon several attributes (or factors or characteristic), including: (1) CPU Privilege Modes, or RISC-V modes (Reduced Instruction Set Computer-V modes); (2) a Runtime Root of Trust (RRoT) mode (whether within or not within that mode); (3) modes relating to Bus Master Type (e.g. CPU, Secure DMA, RunTime Integrity Checker (RTIC)); (4) modes related to Security State (LMDA, State); and (5) modes related to Access Location (e.g. internal or external).

More particularly with respect to the CPU Privilege Modes (RISC-V modes), in the present embodiment the CPU 106 is (or includes) a RISC-V core, which supports three CPU privilege modes: Machine Mode, Supervisor Mode, and User Mode. Machine mode is more privileged than supervisor mode. User mode is the least privileged. Table 1 illustrates in more detail the characteristics of these three CPU privilege modes.

TABLE 1

| | CPU Privilege Modes | |
|---|---|---|
| 01 | Machine | firmware scheduler and interrupt handlers |
| 11 | Supervisor | firmware application programming interface (API) computations |
| 10 | User | Non-secure customer extension |

With respect to the RROT mode, this is a special access privilege granted by a hardware root of trust of the CPU 106

(or of the enclave 102). A particular entry sequence of instructions into immutable ROM code is required that is monitored by hardware (LMDA). When the hardware determines that the proper sequence has been followed, then the enclave 102 goes into an RROT mode such that particularly sensitive secrets or information are temporarily available for one or more particular purposes (e.g., for attestation of the enclave loadable firmware).

One of the factors required for RROT entry is that the RISC-V core of the CPU 106 must be in machine mode (of the CPU Privileged Modes discussed above) during the sequence but, once RROT mode has been achieved, then RROT mode is independent of the CPU operating mode. This enables the CPU 106 to run complex RROT functions when operating in the RROT mode even when the CPU is operating in less privileged CPU modes, and to reduce the risk of widespread corruption or exposure. Table 2 illustrates in more detail characteristics of the RROT mode relative to a circumstance when the system is in the non-RROT mode (that is, when the system is not operating in the RROT mode).

TABLE 2

RROT/Non-RROT (LDMA) Mode Characteristics/Use Cases

| | |
|---|---|
| RROT | Immutable Runtime Root of Trust process with known entry point. By default at boot and can be reentered in the runtime. Additional temporary privileges are granted. Required to access root of trust security parameters. |
| Non-RROT | Loadable software and typical processes. No access to un-revocable, root of trust or particular high value assets. Depending on other factors, may still have access to derived secrets of high criticality for e.g. authentication processes and device secure storage. |

As for the modes relating to Bus Master Types, the enclave 102 includes a variety of different Bus Masters that are shown in Table 3. As shown, the Bus Masters in the present embodiment include, for example, a CPU Instruction Bus Master, a CPU Data Bus Master, a secure Direct Memory Access (DMA) Bus Master, an external DMA Bus Master (or burst DMA Bus Master), a PKC (Public Key Cryptography) Bus Master, a RTIC Bus Master, and a USM Bus Master (or ICU Bus Master), and a Fast Boost Bus Master. Each of these respective Bus Masters has different inherent capabilities, respectively. Determining access rights based on these capabilities helps to provide finer grain access rights with less complex hardware and less area.

For example, the CPU Bus Master will have an MPU which has fine grain partitioning whereas the DMA does not have an MPU and consequently uses the RDC mechanism to isolate the memory map in very coarse chunks. Therefore a region of memory can be allocated to the CPU exclusively that is much more efficient for ad hoc memory allocation methods that are commonly used by software. As another example, the RTIC is a read-only integrity checking bus master that only hashes data and so can be given more access to the memory map, possibly across multiple regions of varying CPU operating modes and outside the enclave. Both the RTIC and the USM/ICU (Universal Sequence Manager), which may operate as a ZM (zeroize memory or zeroizer), highlight that the respective hardware functions of each of these bus masters may pose different types of concerns or threats (e.g., with respect to the reading of secrets in the case of the RTIC, or with respect to the corrupting of data in the case of the USM/ICU), and so each can be allowed to access memory under significantly different security conditions (factors).

With respect to the modes associated with the Security State of the enclave 102, the enclave has a hardware security state machine that represents the authenticity and integrity of the loadable firmware and the trustworthiness of the operating environment. At boot time when un-patchable ROM code is running and there are no detected operating hazards such as out of range voltage or temperature, then the security state machine is placed into the Secure State. Then the ROM patch is loaded and verified. If the ROM patch verifies (is successfully verified), then the security state remains (that is, the enclave 102 remains in the Secure State) and ROM code can jump to the patchable section of ROM code. Then the loadable firmware is loaded and verified. If the loadable firmware authenticates (or is successfully verified), then the security state remains (that is, the enclave 102 remains in the Secure State) and execution can jump to the firmware.

TABLE 3

Bus Master Mode Characteristics/Use Cases (and Corresponding Ports)

| | | |
|---|---|---|
| M0 | CPU Instruction | Instruction access with MPU for privileged access |
| M1 | CPU Data | Data access with MPU for privileged and fine grain memory partitioning. |
| M2 | DMA (secure) | Robust DMA to move and copy data within the enclave. |
| M3 | DMA (burst) | Performance DMA to move data to and from the enclave. Almost all transaction will include off-enclave accesses. |
| M4 | PKC | Performs highly sensitive signature functions. All accesses will be internal and many will involve encryption keys. |
| M5 | USM/ICU | USM/ICU (Universal Sequence Manager) performs memory preparation tasks after reset and before the enclave CPU is allowed to execute. This module when initiated automatically erases (overwrites) secrets and it does so not only after reset (before execution) but also after the event of a security violation. The USM/ICU can only write but cannot read, and so it may pose a concern in terms of the possible corruption of data, but does not pose a concern in terms of the possible exposure of secrets. As such, the USM/ICU can also be considered or referred to as a ZM (zeroize memory or zeroizer). In some cases, it may operate to write to memory to clear out any residual data before processing begins. |
| M6 | Fast Boot | Used temporarily at boot time to load and measure enclave firmware in the enclave by a trusted MSC engine. After the enclave software is loaded and verified then this path is closed. The path sequences from no access to write only for loading code to read only for measuring code to no access. This path is not always used and so maybe tied off |

TABLE 3-continued

Bus Master Mode Characteristics/Use Cases (and Corresponding Ports)

| | |
|---|---|
| | or disabled by fuse on some SoCs. |
| M7 RTIC | Autonomous code integrity checking engine (or RunTime Integrity Checker). Once activated then the RTIC reads data. The RTIC can only read from resources, and so the RTIC may pose a concern in terms of the possible exposure of secrets, but does not pose a concern in terms of the possible corruption of data. |

If at any time conditions change such the integrity of the operations cannot be verified then the state machine is triggered and it moves from the Secure State into a Fail State. Or alternatively, the secured state code may authenticate a debug request token. If this verifies (that is, the debug request token is verified), then the enclave 102 operating in the Secure State prepares the execution environment for hazardous code and then moves the state machine into a Debug State. When in the Debug State, the loadable software is not trustworthy but is allowed to run without access to any real secrets, that is, only facsimile (fake) secrets are available in the Debug State or mode. Table 4 describes in more detail the various security state modes of the enclave 102, including the aforementioned security states as well as an Unknown (Check) State, as well as corresponding characteristics/use cases for those security state modes . . .

TABLE 4

Security State Mode Characteristics/Use Cases

| | |
|---|---|
| Unknown (Check) | Boot state. ROM code and hardware determines to go directly to Secure, Debug, or Fail states from here. |
| Secure | All conditions indicate trustworthy code and environment. Access to protected (but revocable) secrets is allowed. |
| Fail | The intent was a trustworthy environment but conditions, events or code has caused a catastrophic (unrecoverable) failure. |
| Debug | Authorized use of non-trustworthy code. No access to real secrets. Transition from this state to Fail state only if the integrity of the mechanisms that ensure a isolated debug environment can be trusted. |

With respect to the modes relating to Access Location (particularly relating to internal and external accesses), the enclave 102 (in concept) is intended to be a closed system with very limited access to the SoC. Some operations of the enclave 102 are highly security sensitive and any malfunction in the operation whether due to an attack or a bug could result in exposure or corruption if firewalls are not in place during the operation. Therefore the enclave 102 provides a discretionary mechanism for partitioning the enclave memory map in terms of internal and external exposure, which respectively are referred to herein also as Red (internal) and Black (external) exposures.

As an example (on one hand), since all RROT operations are highly sensitive, the RROT memory locations should all be assigned as internal (Red). In such case, if (e.g., for whatever unintended reason) a given RROT bus transaction attempts to access an external location, then the access will be denied. The Secure DMA falls into this category as well. As another example (on the other hand), customer code can be expected to perform many external accesses to perform cryptographic operations on behalf of SoC applications. The customer partitions should be set up so that the external accesses can only be performed in Black mode and internal accesses can only be performed in Red mode.

Notwithstanding the above examples, almost all DMA accesses will be including both internal and external accesses while reading from one location and writing to another. So the access controls can create a shared internal memory buffer such that black external and black internal accesses are allowed and switched to red internal accesses where the buffer data can be securely checked and moved to a more secure location before operating on it. Table 5 describes in more detail the access locations of the enclave 102, as well as corresponding characteristics/use cases for those access locations.

TABLE 5

Access Location Mode Characteristics/Use Cases

| | |
|---|---|
| Internal (Red) | Access to sensitive data or code within the enclave |
| External (Black) | SoC access (off-enclave) or internal import/export buffer for temporary storage |

For completeness sake, another term that affects access permissions is the access type such as reading (R), writing (W), or execution (X) (more generally, R/W/X). A ROM patch or instruction code memory region may be set to Read and Execute no matter what accesses it, to prevent corruption of information that does not need to change.

In at least some embodiments, the SRDC mode of operation may be determined based upon a combination of LMDA state and SRDC software mode(s), which may include any of the following: (1) RROT (c)—Runtime Root of Trust Confidentiality; (2) Secure Red; (3) Secure Black; (4) ROT (i)—Runtime Root of Trust Integrity; (5) Debug Red; (6) Debug Black; (7) Fail. Additionally, there may be three additional privilege modes that are used in conjunction with the SRDC mode: (a) Machine Mode; (b) Supervisor Mode; and (c) User Mode. The SRDC and PRIV mode is communicated through the system via PRIV, DID and RING number attributes For a given access, privilege, domainID and ring values are generated per master access, sent through the bus fabric, then used in the checker in the access evaluation.

Figure 2:
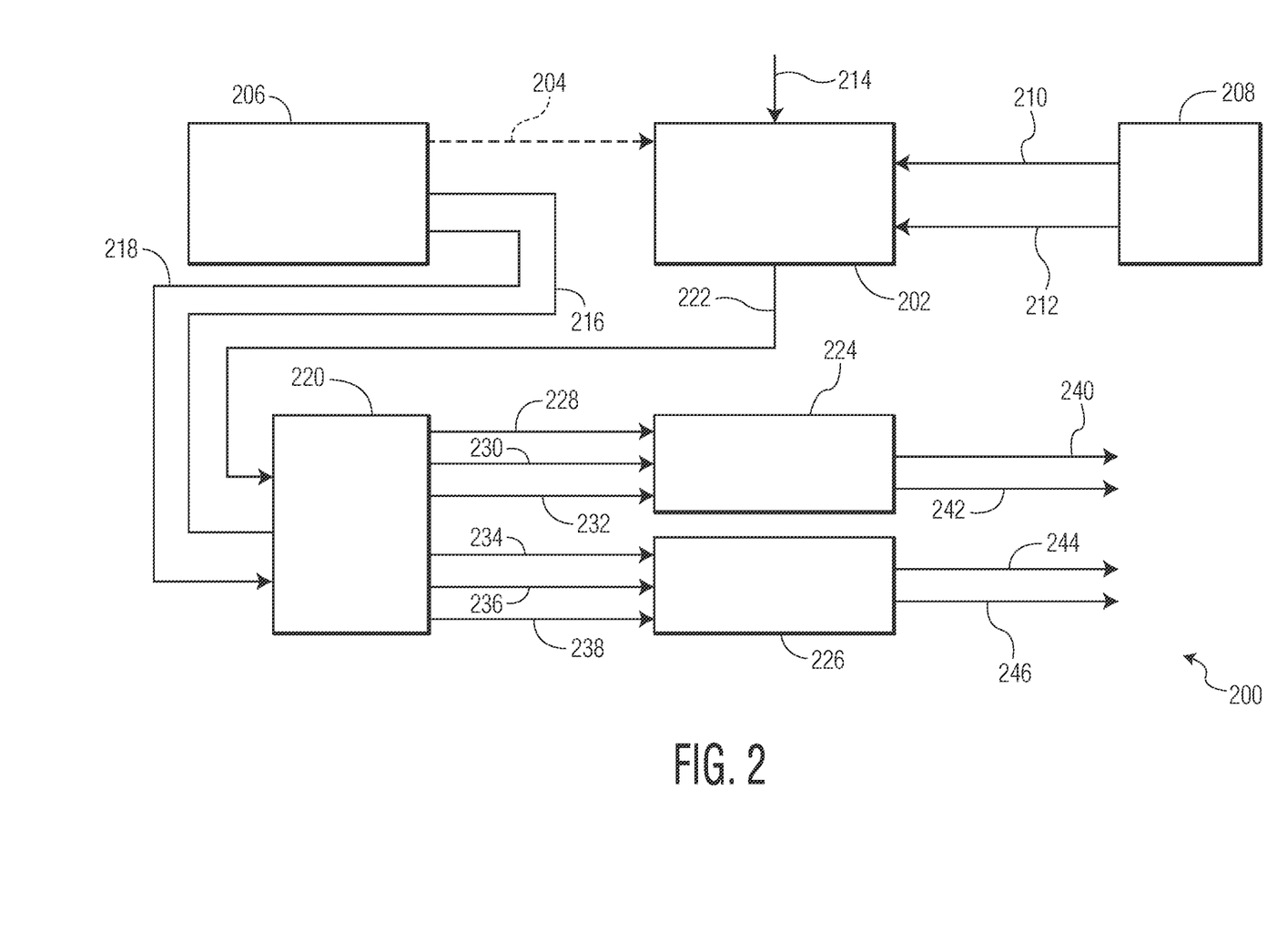
FIG. 2 is a schematic diagram illustrating a process by which the SRDC of the enclave of FIG. 1 is configured to combine access control terms to achieve a bus transaction identity, in accordance with an example embodiment encompassed herein.

Referring to FIG. 2, a block diagram 200 is provided to schematically illustrate a process according to which, in the present embodiment, the various access control terms are combined into a bus transaction identity. That is, the block diagram 200 illustrates a process by which a bus transaction identity is developed taking into account the various factors described above, namely, (1) CPU Privilege Modes (RISC-V modes); (2) Runtime Root of Trust (RRoT) mode (whether within or not within that mode); (3) modes relating to Bus Master Type (e.g. CPU, Secure DMA, RTIC); (4) modes related to Security State (LMDA); and (5) modes related to Access Location (e.g. internal or external).

As shown, in the present embodiment, a SRDC Discretionary Access Control (DAC) Bus Master Type (or more simply "Bus Master") block 202 operates based upon several types of mode information arriving from several sources. As shown, the Bus Master block 202 receives a first information transmission 204 from a Risc-V Zen block 206. The first information transmission 204 particularly includes CPU Privilege Mode (RISC-V mode) information. Also, the Bus Master block 202 receives, from a LMDA block 208, each of a second information transmission 210 including RROT information, and a third information transmission 212 including Secure State information (that is, indicating whether the Bus Master state should be considered Unknown, Secure, Fail, or Debug). Further, the Bus Master block 202 receives a fourth information transmission 214 regarding access location information (e.g., regarding internal (Red) or external (Black) status).

Also at the Risc-V Zen block 206, a Read/Write/Execute (R/W/X) address is determined. The privilege mode and R/W/X address are provided, as fifth and sixth information transmissions 216 and 218, respectively, to a AXBS xbar (crossbar switch) block 220. Additionally, a seventh information transmission 222 is also provided from the Bus Master block 202 the AXBS xbar block 220, where the seventh information transmission concerns SRDC domain identifier (DID) information.

Further as shown, the AXBS xbar block 220 is also in communication with each of a SRDC M{B,R}C block 224 and a SRDC PSC (Peripheral Slot Checker) block 226. The AXBS xbar block 220 transmits eighth, ninth, and tenth information transmissions 228, 230, and 232, respectively, to the SRDC M{B,R}C block 224 and eleventh, twelfth, and thirteenth information transmissions 234, 236, and 238, respectively, to the SRDC PSC block 226. It should be appreciated that each of the eighth and eleventh information transmissions 228 and 234 contains the R/W/X address information also communicated by the sixth information transmission 218, each of the ninth and twelfth information transmissions 230 and 236 contains the privilege mode information communicated by the fifth information transmission 216, and each of the tenth and thirteenth information transmissions 232 and 238 contains the SRDC DID information communicated by the seventh information transmission 222.

Additionally, the SRDC M{B,R}C block 224 outputs fourteenth and fifteenth information transmissions 240 and 242, respectively, and the SRDC PSC block 226 outputs sixteenth and seventeenth information transmission 244 and 246, respectively. Each of the fourteenth and sixteenth information transmissions 240 and 244 communicates R/W/X address information (which can be the same as that received by the eighth and eleventh information transmissions 228 and 234, respectively), and each of the fifteenth and seventeenth information transmissions 242 and 246 communicates respective access error information. In regard to the above discussion, it should be further recognized that non-CPU masters will inherit their privilege level during set-up. Additionally, it should be noted that this concept permits (allows to have) a transaction with different privilege levels at the same time in the system (also it should be noted that the RISC core has the same privilege/CPU privilege).

In the present embodiment, memory access control happens primarily at the Sentinel (Security) Resource Domain Controller (SRDC). The memory access control is implemented in a dedicated IP outside the CPU as the functionality and flexibility of the MPUs (memory protection units) provided with CPUs are insufficient to handle the breadth of factors affecting the trustworthiness of the state of the computing base and the varying degrees of reliability of the code sequences themselves (e.g., RROT code, signed code, debug code).

The CPU privilege modes of the CPU and other bus masters are not modified by the SRDC permission assignment module (DAC) but rather passed around. However, a JR value (indicative of hierarchical privilege) is sent through the DAC, even in the case that it is inherited when the DMA is set up. Essentially, the JR in SRDC may represent the trustworthiness of the execution environment represented by the security state of LMDA for RROT and access location (internal or external) and the DID may represent the bus master (CPU or eDMA or etc . . . ). However, there may be exceptions. For example, the DID of the CPU in a non-fail state may represent the normal or debug mode, and the DID in a fail state may represent a bus master that can clean up or one that cannot.

In at least some embodiments encompassed herein, the system determines whether to grant access to, or deny access to, controls, assets, or resources based upon one or more attributes, and typically multiple (or two or more) attributes. Indeed, there are multiple attributes that may indicate security and that may be considered in granting or denying access. Depending upon the embodiment or implementation, the system may consider various one(s) of the attributes or combinations of the attributes in any of a variety of manners, to determine (or to determine coding that determines) whether access is granted or denied for any given control, asset, or resource. For example, in at least some such embodiments, the attributes of interest can include (for example) any one or more of the following: (1) access; (2) DID; (3) RING; and/or (4) privilege. It should be appreciated that, in such embodiments, privilege is not the only attribute that matters; rather, the system employs multiple types, levels, or layers of security attributes that are built up, for example, in DID and RING.

Further, to the extent that multiple types, levels, or layers of attributes may be considered in determining whether to grant or deny access to a given control, asset, or resource, the different types, levels, or layers of attributes may be, but need not be, hierarchical depending upon the embodiment or circumstance. That is, even if different types, levels, or layers of attributes may be considered, one or more of these different types, levels, or layers, need not be (or need not necessarily be) considered superior or inferior (or more or less rarefied) relative to other one(s) of the types, levels, or layers of attributes. Correspondingly, even if different types, levels, or layers of attributes may be considered in regard to the granting or denying of access to given controls, assets, or resources, it is not necessarily the case that determining whether a first type, level, or layer of attribute is satisfied will in all circumstances, or with respect to all of the different controls, assets, or resources, require a higher level of authorization or greater level of approval than determining whether a second type, level, or layer of attribute is satisfied. To the contrary, depending upon the particular circumstance or the particular control, asset, or resource that is of interest, different ones of the types, levels, or layers of attributes may vary relatively in terms of their significance or in terms of the extents of authorization or approvals that may be required in terms of satisfying those different ones of the types, levels, or layers of attributes.

The present disclosure encompasses numerous different embodiments in which any of a variety of different types, levels, or layers of attributes may be considered in determining whether to grant or deny access to any of a variety of different types of controls, assets, or resources. As an example, Table 6 is provided to show example SRDC identities for the combination of access permission terms, and particularly shows the RING numbers and domain IDs (DIDs) that may be generated for the SRDC bus masters for each of different LMDA states.

differentiate the access rights. For example, in case a DMA operation has been started from a non-secure privilege customer extension (NP), each AHB access by the DMA has to indicate a non-secure context 1 with HPROT [1]=1 access—in that circumstance, the DMA would only have

TABLE 6

SRDC Table

|  |  | CPU I, D | DMA | SDMA | PKC | ICU (write only) | SoC in/ Fastboot | RTIC (read only) |
|---|---|---|---|---|---|---|---|---|
| LMDA HW State | Red/Black | Ringnum, DID | Ringnum, DID | Ringnum, DID | Ringnum, DID | Ringnum, DID | Ringnum, DID | Ringnum, DID |
|  | Red | JR = 0<br>DID = 000 | JR = Prog<br>DID = 010 | JR = Prog<br>DID = 110 | JR = Prog<br>DID = 011 | JR = Prog<br>DID = 100 | JR = 2<br>DID = 101 | JR = Prog<br>DID = 111 |
| Secure | Red | JR = 1<br>DID = 000 | JR = Prog<br>DID = 010 | JR = Prog<br>DID = 110 | JR = Prog<br>DID = 011 | JR = Prog<br>DID = 100 | JR = 2<br>DID = 101 | JR = Prog<br>DID = 111 |
| Secure | Black | JR = 2<br>DID = 000 | JR = Prog<br>DID = 010 | JR = Prog<br>DID = 110 | JR = Prog<br>DID = 011 | JR = Prog<br>DID = 100 | JR = 2<br>DID = 101 | JR = Prog<br>DID = 111 |
|  | Red | JR = 0<br>DID = 001 | JR = Prog<br>DID = 010 | JR = Prog<br>DID = 110 | JR = Prog<br>DID = 011 | JR = Prog<br>DID = 100 | JR = 2<br>DID = 101 | JR = Prog<br>DID = 111 |
| Debug | Red | JR = 1<br>DID = 001 | JR = Prog<br>DID = 010 | JR = Prog<br>DID = 110 | JR = Prog<br>DID = 011 | JR-Prog<br>DID = 100 | JR = 2<br>DID = 101 | JR = Prog<br>DID = 111 |
| Debug | Black | JR = 2<br>DID = 001 | JR = Prog<br>DID = 010 | JR = Prog<br>DID = 110 | JR = Prog<br>DID = 011 | JR = Prog<br>DID = 100 | JR = 2<br>DID = 101 | JR = Prog<br>DID = 111 |
| Fail | Don't Care | JR = 3<br>DID = 000 | JR = 3<br>DID = 001 | JR = 3<br>DID = 001 | JR = 3<br>DID = 001 | JR = 3<br>DID = 000 | JR = 3<br>DID = 001 | JR = 3<br>DID = 001 |

In regard to Table 6, several details are noteworthy. First, it should be appreciated that the CPU privilege mode is not included in the table because this field is independent of the table and of the {JR,DID} attribute. Also, the CPU privilege mode does not change according to the hardware and bus master conditions. Still, it is a field that may be included in a SRDC programming model, where the owner of the SRDC assigns which CPU privilege modes are allowed for each region. Additionally, by default each region is assigned machine mode only but can be modified to allow any combination of the three modes. Further, with respect to red versus black status, each of these statuses may entail (or indicate) sensitivity, but the statuses may entail sensitivity in different manners on different attributes yielding different manners of access/privilege. As an analogy, even though a government employee might gain privilege to look at a secret/confidential document, that government employee may gain privilege to review the secret/confidential document only if that employee enters a secure room in which the employee is unable to communicate with third parties-thus, although one manner of access is expanded, a second manner of access is lessened.

Additionally with respect to Table 6, it should be understood that, for JR, in the case that a fail state occurs, the JR and DID follow as in the table—proceeding directly to the fail values right away with no synchronization needed. Also, for JR and non-fail LMDA SSSM state changes, the JR persists for the DMA and other programmable bus masters. Even RROT-initiated JR values can continue, though read-only memory (ROM) should stop all DMA processes before exiting RROT. In the event of an unforeseen use case where RROT bus mastering is needed, the option to continue is available by hardware. But again, ROM code should shut down its DMA processes when out of RROT. Further, peripherals that implement an AHB (Advanced Microcontroller Bus Architecture high-performance bus) master port like DMA and PKC have to latch the privilege level in which they have been started. The latched privilege level typically is (or may need to be) presented during the AHB access to access to memory regions that are defined read and/or write for DMA and enabled for privilege context 1.

It should be appreciated as well that the SRDC concept meshes with additional access control mechanisms. For example, as mentioned in regard to FIG. 1, in at least some embodiments there may be a MPU (e.g., the MPU 108), and the MPU configuration may be configurable to implement flexible and optimized solutions with respect to memory resources and performance. In at least some embodiments such as that represented by FIG. 1, the secure enclave 102 implements the following AHB masters for which access policies are defined by the MPU 108: CPU; DMA; Secure DMA; PKC; External SoC; RTIC; and ICU. The MPU 108 may operate to help the CPU (e.g., the CPU 106) perform an initial set of access controls for bus transactions that leave the CPU. This may be helpful in terms of providing very fine granularity within a memory region that is available to the CPU 106. Other bus masters without the same granularity of access rights for the CPU privilege should not be allowed.

Further in this regard, the SRDC particularly is configured to prevent non-MPU masters from accessing CPU memory that is further partitioned by the MPU. In this case, the memory region access control configuration (SRDC) simply ensures that only the CPU identities are allowed to RAM (random access memory) access regions that are protected by the MPU. The entire RAM region that the CPU can access and non-MPU bus masters cannot, because they cannot provide the granularity, would be configured to allow any CPU privilege but only from the CPU bus master, and that entire region may or may not require RROT or security state, Black or Red controls. Those assignments remain independent and help illustrate the difference between a CPU privileged controlled region and a trust state of the entire execution environment.

Also, in at least some embodiments encompassed herein, there exist SoC level privileges. In this regard, a service request toward the secure enclave 102 from a secure enclave external master which results in a DMA transaction should inherit the same ID as the requesting master. Accordingly, any access into the SoC memory space via the DMA out port should use the DID of the requestor or, respectively, the DID of secure enclave 102 itself in case the transfer is not triggered by a service request. To achieve this, secure enclave 102 will output a MU identifier via which the service request has been received. There will be one number reserved for secure enclave triggered requests. This identifier will be translated by an MDAC being part of the system resource domain controller (RDC). Set-up of this MDAC will be done, checked, and locked during the secure boot.

Figure 3:
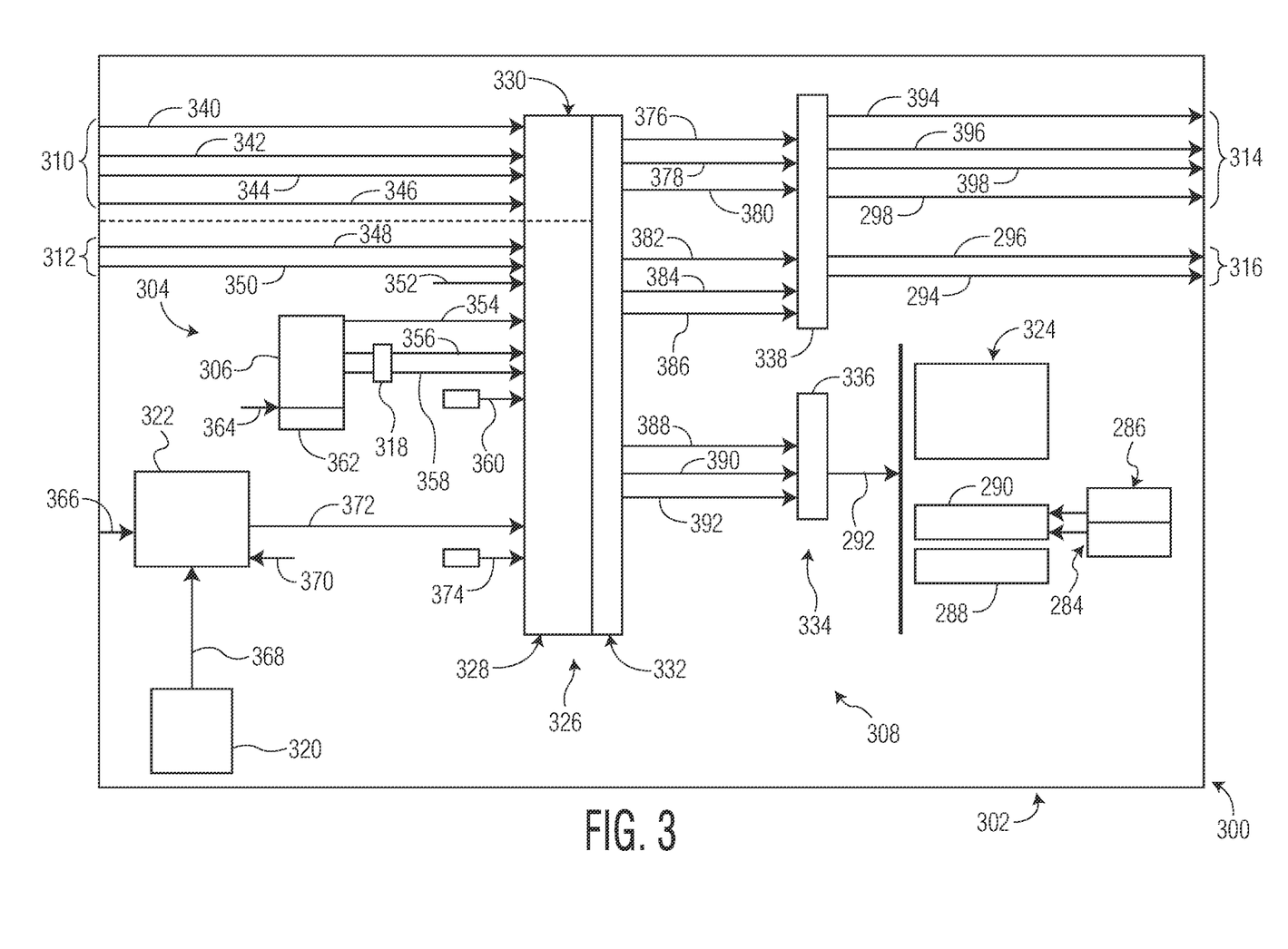
FIG. 3 is a schematic diagram illustrating an example multimodal access control architecture in accordance with an example embodiment encompassed herein, and that particularly illustrates security subsystem aspects with multimodal trust attributes.

Turning next to FIG. 3, a schematic diagram is provided that illustrates an example multimodal access control architecture 300, as may be implemented at least in part by the system of FIG. 1 in at least one embodiment encompassed herein. The multimodal access control architecture 300 of FIG. 3 includes an execution environment 302, a subsystem 304 that includes a CPU 306 and resources 308 for trustworthy operations. As shown, the execution environment 302 is in communication with an off-platform trust bus for receiving first input signal(s) as represented by a first port 310, and in communication with an off-platform public bus for receiving second input signal(s) as represented by a second port 312. Additionally, the execution environment 302 is in communication with the off-platform trust bus for providing first output signal(s) as represented by a third port 314, and in communication with the off-platform public bus for providing second output signal(s) as represented by a fourth port 316.

Further as shown, in the present example embodiment, the execution environment 302 includes a MPU 318 and also includes (or is in communication with) one or more sensors 320. The one or more sensors 320 may be configured to detect one or more characteristics or conditions of interest such as, for example, voltages (e.g., out-of-range voltages), currents, frequencies, signals (e.g., electromagnetic signals as detected by antennas), temperatures, or intrusions (e.g., tamper detections).

Additionally, the execution environment 302 includes a state machine 322, which can be referred to as an integrity and authenticity state of software state machine. The state machine 322 indicates the secure boot cycle from reset to the present operation (boot and runtime). Different state progressions indicate a secured or non-secured progression. The CPU 306 has privilege states for most and least secure modes where the most privileged tasks manage the less privileged processes. In addition to bus fabric and the first port 310, second port 312, third port 314, and fourth port 316 serving as input/output terminals for accesses off-platform, the execution environment 302 also includes regions and peripherals 324 that may have various security sensitivities (e.g., integrity, confidentiality, authenticity, high, medium, and/or low). The regions and peripherals 324 may include ROM and RAM.

In addition, the execution environment 302 includes a SRDC enhanced access rights control mechanism (or simply SRDC) 326. The SRDC 326 operates to isolate memory regions based on the CPU privilege and domain identity or bus master ID. Further, the SRDC 326 includes a SRDC trust factors attribution section (or trust attribute section) 328 and a fabric switch section 332. The SRDC trust attribute section 328 receives and includes security state, root of trust state, sensor, intrusion, and other trust factors, some of which may also be referred to as environment and/or measured trust factors, and some of which may be referred to as initiator specific trust factors. The SRDC trust attribute section 328 may also serve to perform SRDC trust factors mapping, and have a trust bus attribute remap 330.

The trust factors are encoded into the SRDC trust attribute section 328 that is assigned at the bus master side and conveyed by the fabric switch section 332 on the bus to a destination SRDC 334, which is shown to have a first portion 336 and a second portion 338. The destination SRDC 334 in turn determines if access should be allowed or denied based on this additional information.

More particularly as shown in FIG. 3, in the present embodiment the SRDC trust attribute section 328 receives source trust identifier (ID) information 340, off-platform SRDC trust attribute information 342, CPU privilege mode information 344, and bus information 346 by the first port 310, which are received at terminals/pins T0. Based upon these types of received information 340, 342, 344, and 346, the SRDC trust attribute section 328 may perform/prepare the trust bus attribute remap 330.

Also, the SRDC trust attribute section 328 receives, at terminals/pins M0, CPU privilege mode information 348 and address and data (R/W/X) information 350 by the second port 312. As indicated by an arrow 352, this information is external and has (inherently) Black (external) status. Further, the SRDC trust attribute section 328 also receives CPU privilege mode information 354 from the CPU 306, and receives instruction bus information 356 and data bus information 358 from the MPU 318, which in turn receives the instruction bus information 356 and data bus information 358 from the CPU 306. These various types of information received directly or indirectly (via the MPU 318) from the CPU 306 may be received at any of a plurality of terminals/pins Mn (e.g., M1, M2 . . . Mn). As indicated by a block and arrow 360, this information (or different portion(s) of this information) may have either Red (internal) or Black (external) status.

It should be appreciated as well that the CPU 306 may be referred to as an initiator (CPU, DMA, etc.) and takes into account (or receives) measured RROT factors 362 and receives interrupts/exceptions information as represented by an arrow 364. Additionally, the state machine 322 receives debug/test detection information as represented by an arrow 366, receives local environment information provided by the one or more sensors 320 as represented by an arrow 368, and receives chip lifecycle information as represented by an arrow 370. Based upon this received debug/test detection, local environment, and chip lifecycle information, the state machine 322 generates and outputs local software authenticity and integrity state information 372. Both the state information 372, and also RROT state information as represented by a box and arrow 374, are received at the SRDC trust attribute section 328 as the environment and/or measured trust factors.

Further with reference to FIG. 3, the fabric switch 332 of the SRDC 326 generates output signals based upon the various types of the information received by the SRDC trust attribute section 328 as described above (that is, the information 340, 342, 344, 346, 348, 350, 354, 356, 358, 372, and 374). First, the fabric switch 332 generates first SRDC trust attributes information 376, first CPU privilege slate information 378, and first bus information 380, as well as second SRDC trust attributes information 382, second CPU privilege slate information 384, and second bus information 386, all of which types of information are communicated to the second portion 338 of the destination SRDC 334. Additionally, the fabric switch 332 generates third SRDC trust attributes information 388, third CPU privilege slate information 390, and third bus information 392, all of which types of information are communicated to the first portion 336 of the destination SRDC 334.

Based upon the information received at the second portion 338 of the destination SRDC 334 (the information 376, 378, 390, 382, 384, and 386), the second portion makes access control configurations or determinations. In turn, the second portion 338 of the destination SRDC 334 provides source trust identification information 394, SRDC trust attributes information 396, CPU privilege information 398, and bus information 298 for receipt by the first port 314, and also provides CPU privilege state information 296 and bus information 294 for receipt by the second port 316. Additionally, based upon the information received at the first portion 336 of the destination SRDC 334 (the information 388, 390, and 392), the first portion also makes access control configurations or determinations. In turn, the first portion 336 of the destination SRDC 334 provides output information 292 for receipt by the regions or peripherals 324. Also, it should be appreciated that RROT state information 290, and possibly subsystem configuration information 288 as well, is or are generated based upon fuse and pin configuration information represented by a box and arrow 286, as well as based upon measured RROT factors as represented by a box and arrow 284.

Figure 4:
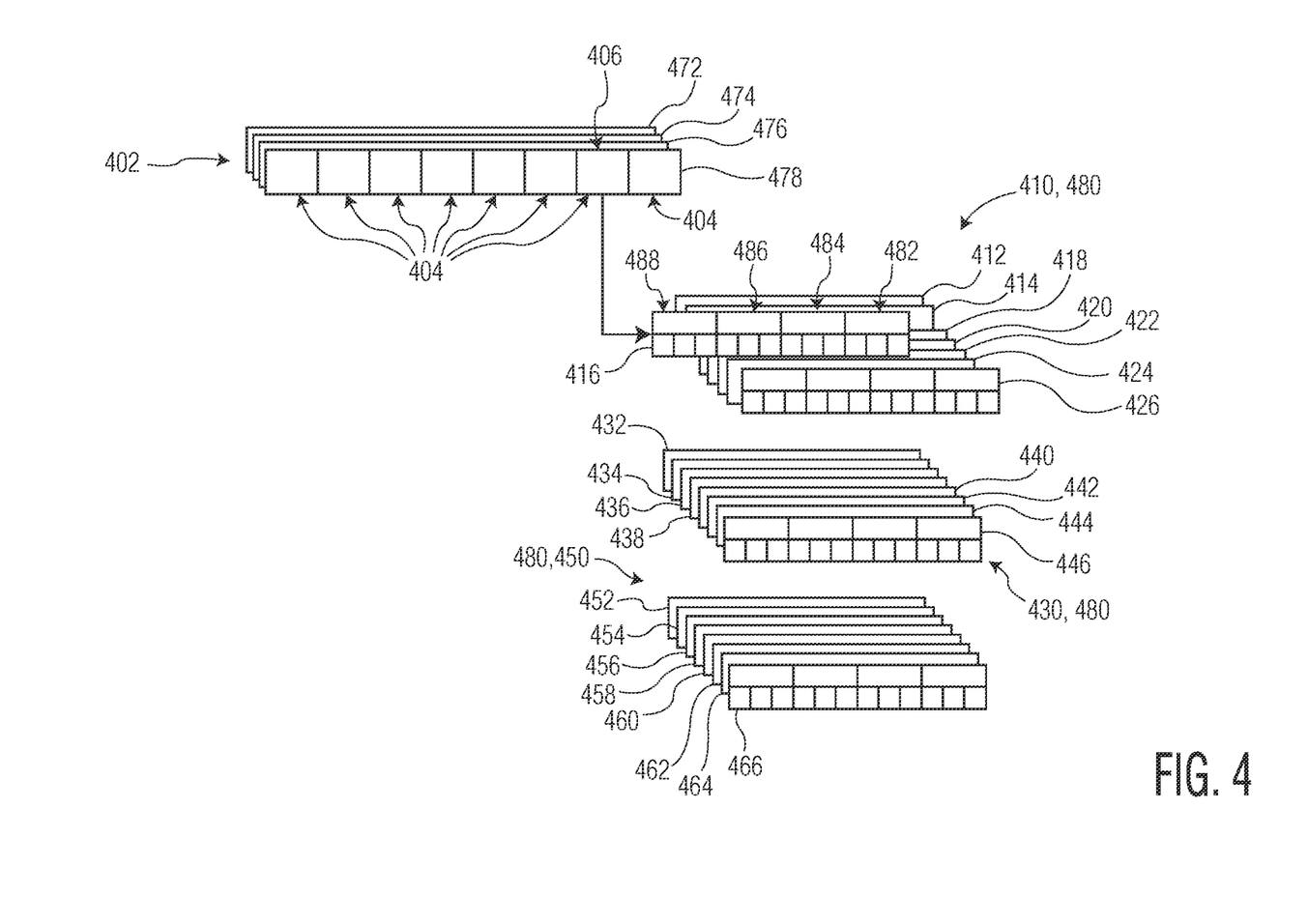
FIG. 4 is a schematic diagram illustrating a process by which the SRDC of the enclave of FIG. 1 performs SRDC access control policy selection.

Turning to FIG. 4, in the embodiments represented by FIG. 1 and FIG. 3, it is particularly the SRDC 110, SRDC enhanced access rights control mechanism (or simply SRDC) 326, and destination SRDC 334 that assess or perform resolution of or among the various trust attributes, or access control policy selection. In this regard, FIG. 4 is provided to illustrate an example access control policy selection. In this example, the transaction has the following attributes: DID=1, RING=2, PRIV=Machine. If the transaction is a read, it will be allowed to continue. If it is a write or execute, the access is terminated with a bus error. It should be noted additionally that, in the present embodiment, the SRDC includes (or even overloads) the terms DID and RING to map the new trust attributes for both mutually suspicious, equal privilege (DID) and hierarchical privilege (JR). Further, in the present embodiment involving the multimodal access control architecture, these attributes also represent root of trust detection and trust state of the secure enclave's environment.

More particularly, FIG. 4 particularly provides a schematic 400 illustrating how the various types of attributes described above are organized, configured, and considered by the SRDC 110 (and the SRDC 326/destination SRDC 334) during the process of access control policy selection. As illustrated, there may be a plurality of address space descriptors (ASDs) 402. In the present example, there are four of the ASDs 402, namely, ASDs 472, 474, 476, and 478, respectively, although any arbitrary number of ASDs may be present. Each of the ASDs 402 in the present embodiment includes eight (8) domains 404, each of which corresponds to a different DID (domain identifier), such as, for example, ACSD0, ACSD1, ACSD2, ACSD3, ACSD4, ACSD5, ACSD6, and ACSD7, respectively. To facilitate illustration, a first one 408 of the eight domains 404 is illustrated as being selected.

Each of the eight domains 404 has three CPU Privilege Mode banks 406 associated therewith, namely, a machine mode bank 410, supervisor bank 430, and a user mode bank 450. FIG. 4 particularly shows the three CPU Privilege Mode banks 406 of the first one 408 of the eight domains, although it should be appreciated that each if the eight domains 404 respectively has three of the CPU Privilege Mode banks. Further, each of the CPU Privilege Mode banks 406 of each of the eight domains 404 includes eight respective local access control policies 480 (which can respectively be identified by names LOC AC0, LOC AC1, LOC AC2, LOC AC3, LOC AC4, LOC AC5, LOC AC6, and LOC AC7, respectively). That is, with respect to the first one 408 of the eight domains shown in FIG. 4: the machine mode bank 410 includes local access control policies 412, 414, 416, 418, 420, 422, 424, and 426; the supervisor bank 430 includes local access control policies 432, 434, 436, 438, 440, 442, 444, and 446; and the user mode bank 450 includes local access control policies 452, 454, 456, 458, 460, 462, 464, and 466.

Additionally, as shown, each of the local access control policies 480 includes four RING numbers (associated with a 4-level RING model), and FIG. 4 particularly illustrates the first, second, third, and fourth RING numbers 482, 484, 486, and 488, respectively (having names RING0, RING1, RING2, and RING3, respectively), of the local access control policy 416 of the machine mode bank 410 of the first one 408 of the eight domains 404. As also illustrated, each of the RING numbers 482, 484, 486, and 488 includes respective R/W/X information, with the RING number 484 as an example has R/W/X values in which R=1, W=0, and X=0.

Given these characteristics, it should be appreciated that, in the present example represented by FIG. 4, access control policy selection may be understood to proceed on the following basis. In particular, the domainID of the current transaction may select an appropriate 3-bit ACSDx (Access Control Select for Domain "X") from the selected descriptor register. The ACSDx field selects the [m]_LOC_AC[p] access control policy register which defines the access rights based on the 4-level Ring model. Further, the privilege mode of the current transaction may select an appropriate bank of [m]_LOC_AC[p] registers, where mode [m]-mm (Machine Mode), sm (Supervisor Mode), um (User Mode), and local access policy [p]=0-7 (policy). Further, as noted previously, the resulting hierarchical access control model specifies that Machine Mode>Supervisor Mode>User Mode, and also that Ring0>Ring1>Ring2>Ring3.

After the appropriate access policy has been selected, the next function is the actual access evaluation. Further, after the access control policy (ACP) evaluation is complete and the access error signal generated, the transaction is allowed to continue if it has sufficient access rights, else the access is aborted with the address and attribute information captured in the appropriate error registers.

It should also be appreciated that, with respect to the example of FIG. 4, the SRDC's operation relies to a significant extent upon the actual access violation check performed by the memory checker (MBC/MRC) and peripheral slot checker (PSC). The domain assignment mechanisms and the tracking of the domain identifier and ring number as address attributes through the system bus switching fabric(s) are of importance. Additionally, as transactions reach the slave memory and peripheral controllers, the address is used to select the appropriate address space descriptor.

Figure 5:
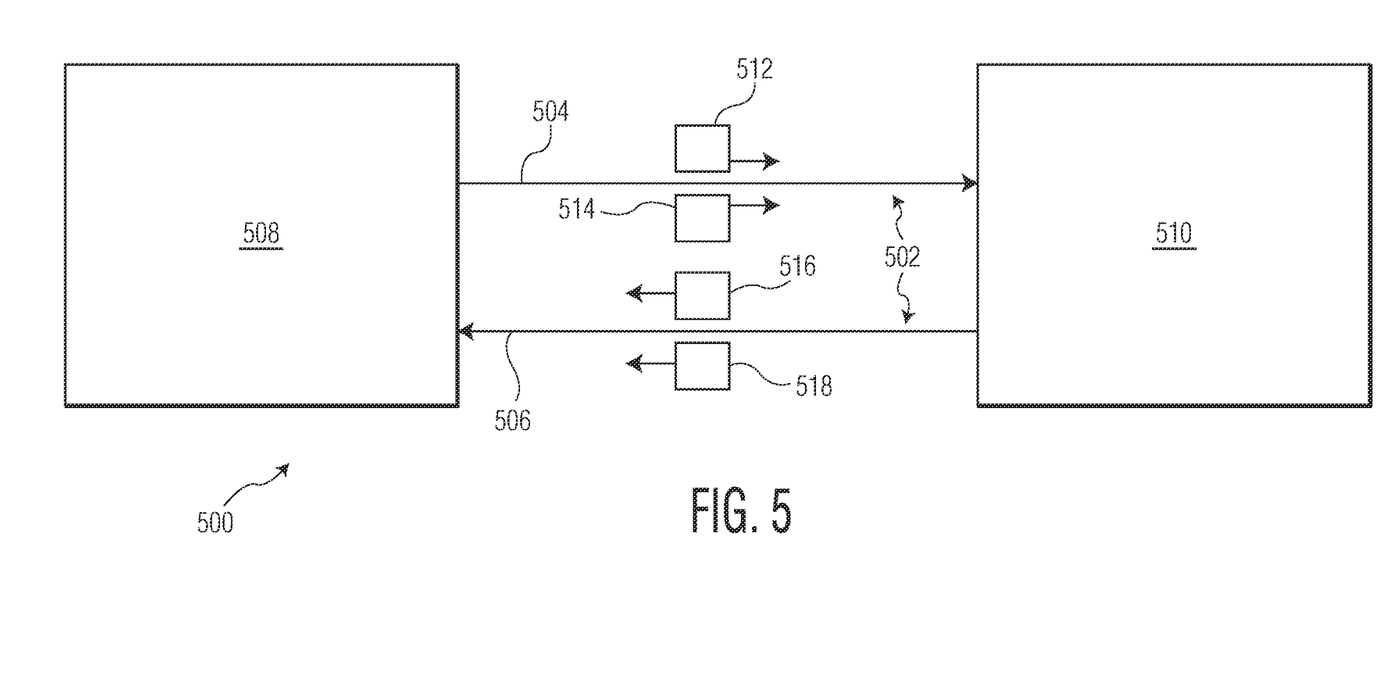
FIG. 5 is a schematic diagram illustrating a combination system having multiple security subsystems that operate together based upon shared trust attribute information.

Further, referring to FIG. 5, it should be appreciated that the implementation of an SRDC and the use of trust attribute(s) may be extended to other security systems/subsystems, including to multiple security subsystems. As an example, in an architecture 500 shown in FIG. 5, there is a trust bus 502 having first and second trust bus connections 504 and 506, respectively, which link/connect a first security subsystem 508 and a second security subsystem 510. As illustrated figuratively, the first trust bus connection 504 of the trust bus 502 communicates or conveys first trust attribute(s) 512 along with a first trust source ID 514 of the first security subsystem 508, and the second trust bus connection 506 of the trust bus 502 communicates or conveys second trust attributes 516 along with a second trust source ID 518 of the second security subsystem 510 are conveyed. With this, a destination subsystem can determine the trustworthiness of the initiating subsystem and map that into a local security attribute with an addition column of the SRDC Access Control matrix. When the source subsystem is trustworthy, then it may be allowed to access more sensitive regions in the destination subsystem.

In this regard, it should be noted that incoming public bus transactions are typically always downgraded and may be give very little if any access rights. But there are times when some access to quarantined memory locations is useful. Of course the trustworthiness of the source on a public bus would not be high and so the SRDC attributes the bus transaction accordingly.

Not withstanding the above description, the present disclosure is intended to encompass numerous embodiments including those disclosed herein as well as a variety of alternate embodiments. At least some embodiments encompassed herein may be used on multi-core SoCs that use access controls and have a multitude of security measurement methods.

Additionally, in at least one example embodiment, the present disclosure relates to a method of multi-modal security access control for a System on a Chip (SoC). The method includes providing a secure enclave including a plurality of bus masters and a Sentinel Resource Domain Controller (SRDC). The method also includes receiving a request to access a control, asset, or resource from a first bus master of the plurality of bus masters. The method further includes assessing a plurality of attributes associated with the request, where the plurality of attributes include each of: a first attribute that is a privilege mode attribute; a second attribute that concerns an applicability or inapplicability of a Runtime Root of Trust (RRoT) mode; a third attribute relating to a bus master type; and a fourth attribute related to a security state. The method additionally includes determining, based upon the plurality of attributes associated with the request, whether the request to access is granted or denied. The method also includes causing the control, asset, or resource to which the request to access is directed to be accessible or inaccessible based upon the determining.

Further, in at least one additional example embodiment, the present disclosure relates to a method of multi-modal security access control for a System on a Chip (SoC). The method includes providing a secure enclave including a plurality of bus masters and a Sentinel Resource Domain Controller (SRDC), where the plurality of bus masters includes a first bus master that is a central processing unit (CPU). The method also includes receiving a request to access a control, asset, or resource from the first bus master. The method further includes assessing a plurality of attributes associated with the request, wherein the plurality of attributes include each of: a first attribute that is domain identifier (DID) attribute; a second attribute that is a ring number attribute; a third attribute that is a privilege mode attribute; a fourth attribute that concerns an applicability or inapplicability of a Runtime Root of Trust (RRoT) mode; a fifth attribute relating to a bus master type; and a sixth attribute related to a security state. The method also includes determining, based upon the plurality of attributes associated with the request, whether the request to access is granted or denied. The method also includes causing the control, asset, or resource to which the request to access is directed to be accessible or inaccessible based upon the determining.

Additionally, in at least one further example embodiment, the present disclosure relates to a system for providing multi-modal security access control for a System on a Chip (SoC). The system includes a secure enclave including a plurality of bus masters, a Sentinel Resource Domain Controller (SRDC) at least indirectly coupled to the plurality of bus masters, and at least one port by which the secure enclave may be coupled to at least one external bus. Additionally, the SRDC is configured: to receive, at least indirectly, a request to access a control, asset, or resource from a first bus master of the plurality of bus masters; and to assess a plurality of attributes associated with the request. The plurality of attributes include each of a first attribute that is a privilege mode attribute, a second attribute that concerns an applicability or inapplicability of a Runtime Root of Trust (RRoT) mode, a third attribute relating to a bus master type, and a fourth attribute related to a security state. Further, the SRDC is configured: to make a determination, based upon the plurality of attributes associated with the request, as to whether the request to access is granted or denied; and to cause the control, asset, or resource to which the request to access is directed to be accessible or inaccessible based upon the determination. In at least some such embodiments, the SRDC includes a SRDC enhanced access rights control mechanism having a SRDC trust factors attribution section and a fabric switch section, and a destination SRDC.

One or more of the embodiments encompassed herein can be advantageous in any of a variety of respects. For example, at least some systems or methods disclosed herein are advantageous in that such systems or methods provide a manner in which the accessing of (or denying of access to) controls, assets, or resources (or sensitive information) may be governed in a nuanced manner taking in to account one (or two) or more of a variety of different attributes, characteristics, or considerations. Thus, the present disclosure envisions embodiments that operates so that, for example, a request for access to a given control, asset, or resource may be granted in each of a first circumstance when a first one of a plurality of attributes indicates that a higher security threshold should be met if a second one of the plurality of attributes indicates that only a lower security threshold need be met, and also in a second circumstance when the first one of the plurality of attributes indicates that only the lower security threshold (or another lower security threshold) need be met even though the second one of the plurality of attributes indicates that the higher security threshold (or another higher security threshold) should be met.

While the principles of the invention have been described above in connection with specific apparatus, it is to be clearly understood that this description is made only by way of example and not as a limitation on the scope of the invention. It is specifically intended that the present invention not be limited to the embodiments and illustrations contained herein, but include modified forms of those embodiments including portions of the embodiments and combinations of elements of different embodiments as come within the scope of the following claims.

What is claimed is:

1. A method of multi-modal security access control for a System on a Chip (SoC), the method comprising:
provinding a secure enclave including a plurality of bus masters and a Sentinel Resource Domain Controller (SRDC);
receiving a request to access a control, asset, or resource from a first bus master of the plurality of bus masters;

assessing a plurality of attributes associated with the request, wherein the plurality of attributes include each of:
  a first attribute that is a privilege mode attribute;
  a second attribute that concerns an applicability or inapplicability of a Runtime Root of Trust (RRoT) mode;
  a third attribute relating to a bus master type; and
  a fourth attribute related to a security state;
determining, based upon the plurality of attributes associated with the request, whether the request to access is granted or denied; and
causing the control, asset, or resource to which the request to access is directed to be accessible or inaccessible based upon the determining.

2. The method of claim 1, wherein the plurality of attributes that are assessed additionally includes a fifth attribute related to an access location.

3. The method of claim 2, wherein the fifth attribute has a higher sensitivity value if the control, asset, or resource to which the request is directed is at an internal location, and has a lower sensitivity value if the control, asset, or resource to which the request is directed is at an external location.

4. The method of claim 2, wherein the plurality of attributes additionally includes an access type term such as a reading (R), writing (W), or execution (X) characteristic.

5. The method of claim 1, wherein the plurality of attributes that are assessed additionally includes a fifth attribute that is either a domain identifier (DID) or a ring number attribute.

6. The method of claim 1, wherein the privilege mode attribute is one of a machine mode bank, supervisor mode bank, or user mode bank.

7. The method of claim 1, wherein the first bus master is a central processing unit (CPU).

8. The method of claim 1, wherein the bus master type concerns one of a CPU, a secure Direct Memory Access (DMA), and a RunTime Integrity Checker (RTIC).

9. The method of claim 1, wherein the security state is one of an unknown state, a secure state, a fail state, and a debug state.

10. The method of claim 1, wherein the fourth attribute related to the security state is determined at least in part by a state machine based at least indirectly upon one or more of debug or test detection information, local environment information received from one or more sensors, and chip lifecycle information.

11. The method of claim 1, wherein either the request or an additional request is received via an off-platform trust bus or an off-platform public bus.

12. The method of claim 1, wherein first information concerning at least some of the plurality of attributes are received by a crossbar switch that in turn communicates the first information or second information based upon the first information for receipt by the SRDC.

13. The method of claim 1, wherein the determining of whether the request is granted or denied further considers which of a plurality of local access control policies within a privilege mode bank corresponding to the privilege mode attribute further corresponding to a specified domain identifier (DID) associated with an address space descriptor is applicable.

14. The method of claim 1, wherein the request may be granted in each of a first circumstance when a first one of the plurality of attributes indicates that a higher security threshold should be met if a second one of the plurality of attributes indicates that only a lower security threshold need be met, and in a second circumstance when the first one of the plurality of attributes indicates that only the lower security threshold need be met even though the second one of the plurality of attributes indicates that the higher security threshold should be met.

15. The method of claim 1, further comprising sharing trust information between a first subsystem including the secure enclave and a second subsystems.

16. A method of multi-modal security access control for a System on a Chip (SoC), the method comprising:
  providing a secure enclave including a plurality of bus masters and a Sentinel Resource Domain Controller (SRDC), wherein the plurality of bus masters includes a first bus master that is a central processing unit (CPU);
  receiving a request to access a control, asset, or resource from the first bus master;
  assessing a plurality of attributes associated with the request, wherein the plurality of attributes include each of:
    a first attribute that is domain identifier (DID) attribute;
    a second attribute that is a ring number attribute;
    a third attribute that is a privilege mode attribute;
    a fourth attribute that concerns an applicability or inapplicability of a Runtime Root of Trust (RRoT) mode;
    a fifth attribute relating to a bus master type; and
    a sixth attribute related to a security state;
  determining, based upon the plurality of attributes associated with the request, whether the request to access is granted or denied; and
  causing the control, asset, or resource to which the request to access is directed to be accessible or inaccessible based upon the determining.

17. The method of claim 16, wherein either:
  an additional request is received via an off-platform trust bus or an off-platform public bus; or
  the control, asset, or resource to which the request is directed is caused to be made accessible at least indirectly by a communication signal sent by the secure enclave onto the off-platform trust bus or off-platform public bus.

18. The method of claim 17, wherein the fourth attribute related to the security state is determined at least in part by a state machine based at least indirectly upon one or more of debug or test detection information, local environment information received from one or more sensors, and chip lifecycle information.

19. A system for providing multi-modal security access control for a System on a Chip (SoC), the system comprising:
  a secure enclave including a plurality of bus masters, a Sentinel Resource Domain Controller (SRDC) at least indirectly coupled to the plurality of bus masters, and at least one port by which the secure enclave may be coupled to at least one external bus,
  wherein the SRDC is configured:
    to receive, at least indirectly, a request to access a control, asset, or resource from a first bus master of the plurality of bus masters;
    to assess a plurality of attributes associated with the request, wherein the plurality of attributes include each of a first attribute that is a privilege mode attribute, a second attribute that concerns an applicability or inapplicability of a Runtime Root of Trust (RRoT) mode, a third attribute relating to a bus master type, and a fourth attribute related to a security state;

to make a determination, based upon the plurality of attributes associated with the request, as to whether the request to access is granted or denied; and to cause the control, asset, or resource to which the request to access is directed to be accessible or inaccessible based upon the determination.

20. The system of claim 19, wherein the SRDC includes a SRDC enhanced access rights control mechanism having a SRDC trust factors attribution section and a fabric switch section, and a destination SRDC, wherein the secure enclave has a hardware security state machine, wherein the plurality of bus masters includes a central processing unit (CPU) and a memory processing unit (MPU), and wherein the SRDC is distributed across multiple submodules instantiated throughout the system.

* * * * *